United States Patent
Wacke et al.

(10) Patent No.: US 8,958,159 B2
(45) Date of Patent: Feb. 17, 2015

(54) WIDE RANGE ZOOM SYSTEM

(75) Inventors: Michael Wacke, Goettingen (DE); Joerg Sprenger, Goettingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 149 days.

(21) Appl. No.: 13/824,250

(22) PCT Filed: Jun. 17, 2011

(86) PCT No.: PCT/EP2011/060082
§ 371 (c)(1),
(2), (4) Date: Jun. 3, 2013

(87) PCT Pub. No.: WO2012/034723
PCT Pub. Date: Mar. 22, 2012

(65) Prior Publication Data
US 2013/0242407 A1    Sep. 19, 2013

(30) Foreign Application Priority Data
Sep. 17, 2010 (DE) .................. 10 2010 045 860

(51) Int. Cl.
G02B 21/02 (2006.01)
G02B 9/60 (2006.01)
G02B 15/173 (2006.01)
G02B 27/00 (2006.01)

(52) U.S. Cl.
CPC ............ *G02B 21/025* (2013.01); *G02B 15/173* (2013.01); *G02B 27/0075* (2013.01)
USPC .......................................... 359/659; 359/763

(58) Field of Classification Search
CPC . G02B 15/173; G02B 21/025; G02B 27/0075
USPC .................................................. 359/659, 763
See application file for complete search history.

(56) References Cited

U.S. PATENT DOCUMENTS

| | | | |
|---|---|---|---|
| 5,745,298 | A | 4/1998 | Yahagi |
| 5,764,420 | A | 6/1998 | Yahagi |
| 2006/0092504 | A1 | 5/2006 | Hayashi |
| 2008/0062531 | A1* | 3/2008 | Kim et al. ............. 359/676 |

FOREIGN PATENT DOCUMENTS

| | | |
|---|---|---|
| DE | 10007201 A1 | 8/2001 |
| DE | 103 59 733 A1 | 7/2005 |
| DE | 103 55 523 A1 | 8/2005 |
| DE | 10 2004 006066 B4 | 12/2005 |
| DE | 10 2006 036 300 A1 | 3/2007 |
| EP | 1 361 467 A1 | 11/2003 |
| EP | 1 544 653 A1 | 6/2005 |
| JP | 2007-309976 A | 11/2007 |

* cited by examiner

*Primary Examiner* — William Choi
(74) *Attorney, Agent, or Firm* — Patterson Thuente Pedersen, P.A.

(57) ABSTRACT

A wide range zoom system, for microscopes. The zoom system includes five lens groups, of which, starting at the object side, the second and fourth lens group are displaceable in the axial direction relative to the first, third and fifth lens group. A stop of variable opening diameter that is stationary relative to the first, third and fifth lens group is provided between the second and fourth lens group, wherein the maximum opening diameter of said stop is in middle zoom magnifications. As magnification increases, the object-side aperture increases non-linearly in relation to the magnification, such that in regions of low magnifications the object-side aperture increases more sharply than in regions of higher magnifications.

9 Claims, 5 Drawing Sheets

WIDE RANGE ZOOM SYSTEM

PRIORITY CLAIM

The present application is a National Phase entry of PCT Application No. PCT/EP2011/060082, filed Jun. 17, 2011, which claims priority from DE Application No. 10 2010 045 860.0, filed Sep. 17, 2010, said applications being hereby incorporated by reference herein in their entirety.

FIELD OF THE INVENTION

The invention relates to a zoom system of wide zoom range, especially for use in microscopes.

DESCRIPTION OF PRIOR ART

In the recent ten years, the development of microscopes, and more recently of microscopes as well, has been pursued along two major directions:

On the one hand, fluorescence systems with comparatively large numerical apertures between 0.1 and 0.25 at total magnifications of objective and zoom system up to 8× and free mechanical working distances greater than 30 mm have been presented, such as described, for example, in DE 103 55 523 A1, EP 1 361 467 A1 or US 2006/0092504 A1; on the other hand, systems with zoom factors greater than 15× have been developed, as described, for example, in DE 10 2006 036 300 A1.

The trend mentioned first is based on the desire to examine bigger and bigger objects by fluorescence microscopy and achieve, in large fields of view, fluorescence intensities of a level similar to that achieved in classical fluorescence microscopy. This, in the last century, was mainly used to investigate single cells or cell clusters, whereas the aim today is to study organisms of increasing complexity up to small mammals. This calls for high numerical apertures on the one hand, while on the other hand requiring working distances in the range of centimeters, because the objects under observation need to remain accessible to micromanipulators, pipettes and electrodes as known in classical stereomicroscopy.

The other trend mentioned reflects the need to rapidly zoom between low-power comprehensive-view fields of ever-expanding size and detail views magnified to ever-increasing levels. While not restricted to fluorescence microscopy, this requirement comes up especially there: for example, if regions of special interest are to be identified on a relatively large object, say, a mouse, and then to be imaged at a high magnification without the need to change the objective, let alone the microscope.

To implement wide-range zoom systems with a reasonable expenditure of cost and effort, the maximum object-side apertures or, in other terms, the entrance pupil diameters, have to be designed to be of an order of magnitude similar to that of zoom systems with lower zoom factors. In wide-range zoom systems, due to their greater zoom factor and the higher final magnification usually associated therewith, the same object-side aperture is attained only in higher magnifications or for smaller object fields.

DE 103 59 733 A1 describes afocal zoom systems with zoom factors greater than 8× up to 35×. Here, however, the problem of the ever-decreasing image-side aperture described above has a detrimental effect. As the zoom system is designed with a diaphragm of fixed position and diameter, the object-side aperture increases almost linearly, as shown in FIG. 1, so that resolution at medium magnifications is distinctly impaired.

EP 1 361 467 A1 describes afocal zoom systems for a microscope in which the diaphragm is moved together with a movable lens group (component) as the system is zoomed. The object-side aperture behavior thus achieved is favorable for zoom positions of higher magnification, but it needs a rather complex design to implement the follow-up motion of the movable iris diaphragm. Moreover, the four-component design is less suited for higher zoom factors.

JP 2007-309976 A discloses a "DEVICE FOR VARIABLE MAGNIFICATION AND MICROSCOPE" in which an aperture diaphragm is arranged in a fixed position in front of the zoom system, and the diameter of the this diaphragm varies with the movement of the movable components of the zoom system due to a simple mechanical coupling. However, the asymmetric position of the diaphragm restricts the zoom range of the system. Furthermore, the user cannot arbitrarily vary the diaphragm diameter.

The remedy proposed, i.e., a second, manually variable diaphragm in a different plane, has several unfavorable consequences: The settings made are suitable for a single zoom magnification only; as the magnification is zoomed, the second diaphragm will not follow; in order to restitute the same relative f-number in the new zoom position, the diaphragm needs to be repositioned manually. Moreover, the f-number could not be reproduced with sufficient certainty.

If the user, e.g., wants to increase the depth focus in the zoom position in which the first diaphragm is half-closed without previously having manually repositioned the second diaphragm, he will first have to turn the respective control until the second diaphragm is half-closed.

From DE 10 2004 006066 B4, a microscope is known in which an observation parameter that is variably by the user, e.g., magnification, is detected, and an aperture diaphragm in the observation beam path is set to a particular aperture by means of a control unit as a function of the detected value of the said observation parameter.

However, in this case the diaphragm is merely intended for manipulating the aperture behavior given by the optical system. The zoom systems provided conform to prior art, as no particular optical system is specified. Therefore, the manipulation can consist only in decreasing the aperture by means of the diaphragm relative to the system's original. It is not possible with this arrangement to increase the aperture for the purpose of approximately retain the system's maximum aperture already with medium zoom magnifications.

DESCRIPTION OF THE INVENTION

Departing from this, the invention is based on the problem of remedying the disadvantages of prior art as described above and, in particular, creating a zoom system in which the maximum aperture is obtained not only at the maximum zoom magnification but, at least approximately, already when the medium zoom magnification is reached.

According to embodiments of the invention, this problem is solved with a zoom system of the kind mentioned hereinabove and comprising five lens groups, of which, starting on the object side, the second and fourth lens groups can be axially moved relative to the first, third and fifth lens groups, with a diaphragm having a variable aperture diameter being provided between the second and the fourth lens group in a stationary position relative to the first, third and fifth lens groups, with the diaphragm having a maximum aperture diameter at medium zoom magnifications, and, as the magnification is increased, the object-side aperture increases nonlinearly relative to the magnification in such a way that in lower magnification ranges the object-side aperture increases at a higher rate than in higher magnification ranges.

Preferably, the diaphragm is located between the third and the fourth lens group. As a special feature of the invented zoom system, at least 85% of the maximum possible aperture is set already on reaching 60% of the maximum magnification.

An advantage of embodiments of the invention is that the invented wide-range zoom system provides an entrance pupil diameter greater than 35 mm at the final magnification. Further, the zoom system is designed to admit apertures as high as possible already at medium magnifications. In this respect, the distribution of focal lengths in the zoom system is intended to permit lens group focal lengths with just tolerable f-numbers.

Further, the distribution of focal lengths determines the travel lengths of the moved lens groups. When the system is set to medium magnifications, this puts a greater stress on the lens groups in the middle. To enable a continuous aperture behavior throughout the zoom range, it has proved advantageous to leave the control of the aperture to a variable diaphragm and, thus, to vary the optical flux according to the zoom position and the optical correction of the image.

Whereas in prior art it is not possible at medium zoom magnifications to get anywhere near the maximum aperture of the system, this can be achieved with the invented zoom system, because here, other than in prior art, the diaphragm is opened farther than at the extreme zoom magnifications.

According to the invention, by means of a fixed relationship of diaphragm diameter and zoom magnification it is achieved that a maximum diameter of the diaphragm, which varies with zoom magnification, is not exceeded, so that the image is always ensured to be optically corrected.

It is particularly favorable to establish this fixed relationship via an electronic control unit by means of what are known in prior art as virtual control cams. However, the use of virtual control cams for zooming and diaphragm adjustment does not involve the detection of any quantity and the follow-up control of a second quantity as a function of the first one; rather, both quantities are set in synchronism by means of the control unit.

The use of virtual control cams has the advantage that, in addition, different transmission behaviors can be implemented, e.g., behaviors with maximum brightness, with constant image-side aperture or maximum depth of focus, between which the user can select.

The invented fixed relationship between the movement of the optical components and the maximum diameter of the diaphragm can also be implemented by means of a mechanical control cam instead of a virtual one. This is not possible with the diaphragm device disclosed in DE 10 2004 006066 B4, because the aim there is to provide variability for the user.

BRIEF DESCRIPTION OF THE DRAWINGS

Below, the invention is described in some detail on the basis of an exemplary embodiment with reference to the attached drawings, in which.

DETAILED DESCRIPTION

Figure 1:
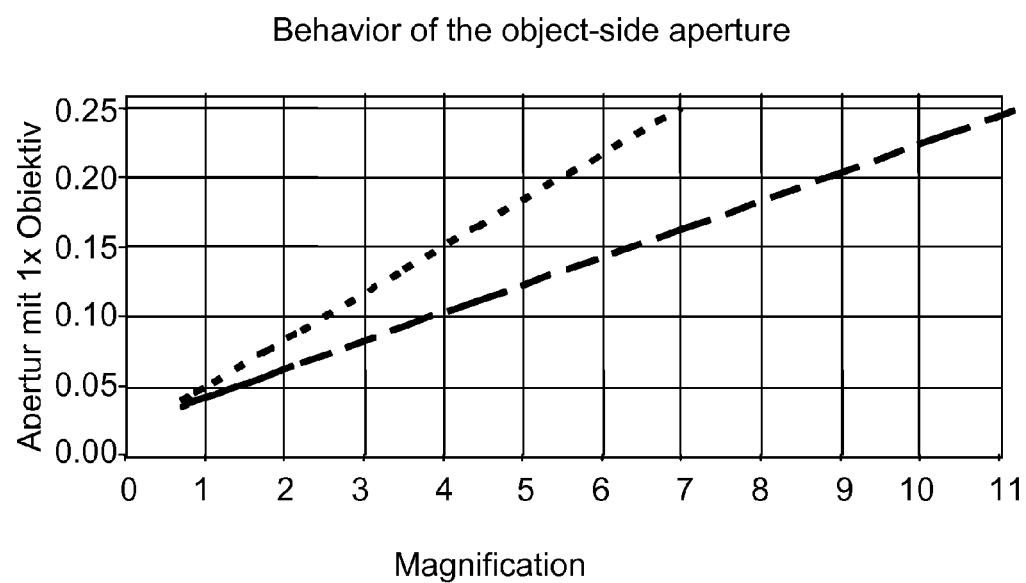
FIG. 1 shows the behavior of the object-side aperture in a zoom system according to prior art.
Figure 2:
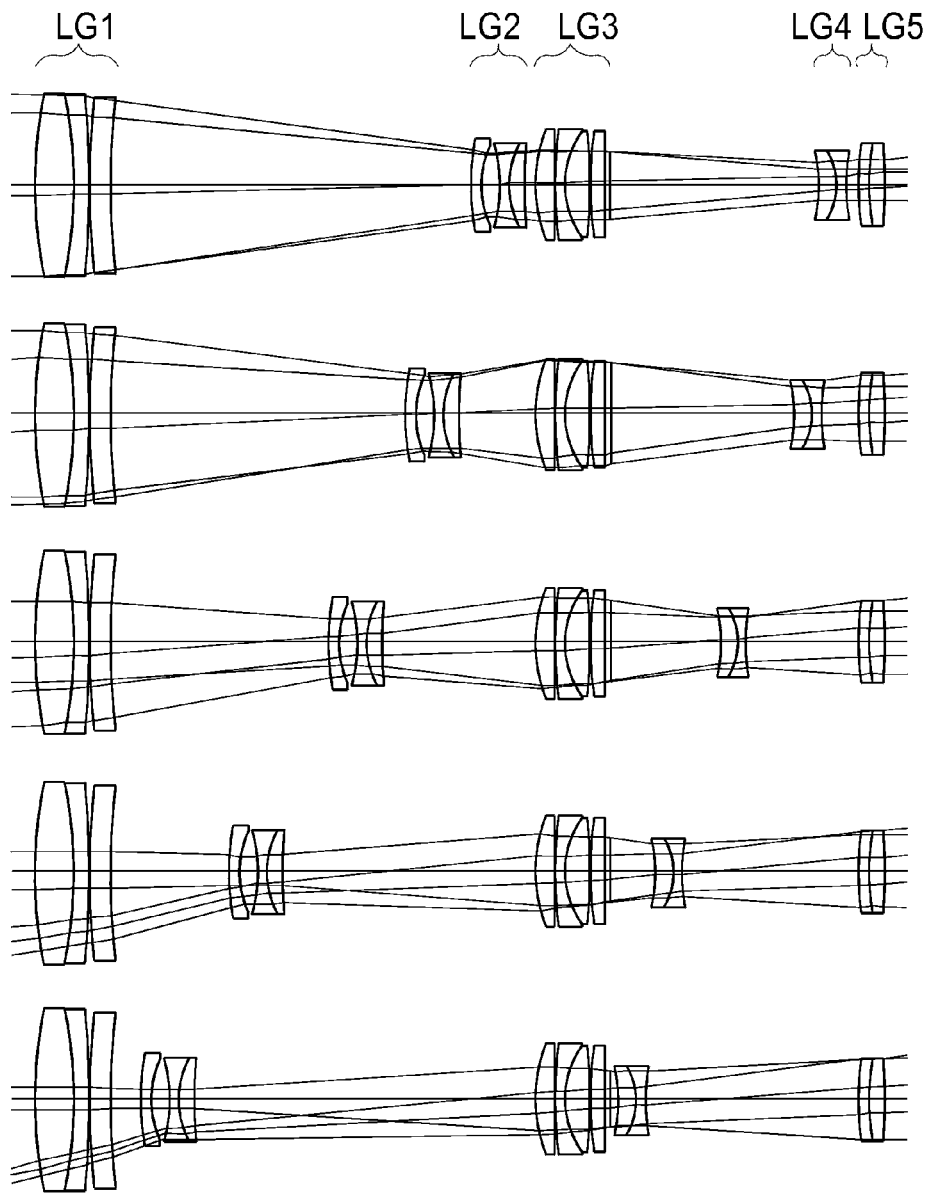
FIG. 2 illustrates the design principle of the invented zoom system in various zoom positions, FIG. 3 the principle of behavior of the object-side aperture in the invented zoom system, FIG. 4 the behavior of the image-side aperture in the invented zoom system, FIG. 5 an object-side aperture behavior in a definite embodiment of the invented zoom system, FIG. 6 the behavior, according to the invention, of the diaphragm diameter through the zoom range.

The invented zoom system is a five-component afocal system, and the distribution of focal lengths is specified in such a way that the first lens group with its long focal length of $f_1'=148$ mm permits a large entrance pupil diameter of 40 mm. The second lens group, which acts as a variator, is composed of three lenses, has a comparatively short focal length of $f_2'=27$ mm and thus permits a zoom factor of 20×.

With the third lens group being composed of four lenses and the diaphragm opening to its maximum diameter (see FIG. 5), the aperture for medium magnifications almost reaches the maximum. The focal length of this lens group is $f_3'=40$ mm, so that this lens group can maintain the apochromatic properties of the zoom system in this magnification range as well.

The fourth lens group with a focal length of $f_4'=-32$ mm and the fifth lens group with a focal length of $f_5'=144$ mm resemble the first and second lens groups with regard to the distribution of focal lengths. They are markedly simpler in design, as, on the one hand, there is a constant field angle of wa=3.7° on the tube side, and, on the other hand, the image-side aperture, e.g., in case a tube lens of focal length $f_T'=180$ mm is used, should not exceed a value of 0.05, for the reasons already given above.

The invented zoom system is designed, e.g., with the lens curvature radii r, the lens thicknesses D (or the distances between den lens groups at magnification GAMMA' of 0.28×), the refractive indices $n_e$ and the Abbe number $v_e$ of the respective lens material, as listed in the table below:

| Surface FL | Radius of curvature r | Thickness D | Refractive index $n_e$ | Abbe number $v_e$ |
|---|---|---|---|---|
| 1 | 91.11357 | 8.500 | 1.49845 | 81.0 |
| 2 | −71.14175 | 3.500 | 1.65803 | 39.5 |
| 3 | −183.02273 | 0.100 | | |
| 4 | 158.22772 | 4.500 | 1.51872 | 64.0 |
| 5 | 153.47275 | 6.6229 | | |
| 6 | 46.10683 | 2.500 | 1.43985 | 94.6 |
| 7 | 22.24624 | 4.100 | | |
| 8 | −30.07461 | 2.000 | 1.65391 | 55.6 |
| 9 | 18.58995 | 3.800 | 1.74341 | 32.0 |
| 10 | 88.60515 | 76.40868 | | |
| 11 | 30.46464 | 4.500 | 1.48794 | 84.1 |
| 12 | −262.91053 | 0.100 | | |
| 13 | 92.93645 | 2.500 | 1.88815 | 40.5 |
| 14 | 20.64110 | 5.200 | 1.53019 | 76.6 |
| 15 | −95.64532 | 0.100 | | |
| 16 | 68.18341 | 3.500 | 1.88815 | 40.5 |
| 17 | 309.33567 | 1.000 | | |
| AD 18 | infinity | 2.08654 | | |
| 19 | −32.67878 | 4.000 | 1.74341 | 32.0 |
| 20 | −14.11981 | 2.000 | 1.62033 | 63.1 |
| 21 | 38.55268 | 47.71906 | | |
| 22 | 63.50711 | 2.500 | 1.72539 | 34.5 |
| 23 | 40.87979 | 3.200 | 1.43985 | 94.6 |
| 24 | −178.06438 | | | |

(AD = aperture diaphragm plane)

The surface 18 in the table represents the aperture diaphragm plane. The second and fourth lens groups move in such a way that, at the magnifications 0.28×, 0.52×, 1.27×, 3.03× and 5.68×, for the air distances D5, D10, D18, D21 of the above table the following sizes (in mm) will be set. The table below also lists the (maximum) diaphragm radius SDIA18 in mm for the magnifications 0.28×, 0.52×, 1.27×, 3.03× and 5.68×.

| GAMMA' | 0.28x | 0.52x | 1.27x | 3.03x | 5.68x |
|---|---|---|---|---|---|
| D5 | 6.623 | 26.308 | 48.817 | 66.224 | 81.032 |
| D10 | 76.409 | 56.723 | 34.215 | 16.808 | 2.000 |
| D18 | 2.087 | 10.153 | 24.792 | 41.500 | 46.926 |
| D21 | 47.719 | 39.653 | 25.013 | 8.305 | 2.880 |
| SDIA18 | 6.125 | 7.147 | 8.922 | 11.138 | 7.262 |

Coupling of the movements of the second and fourth lens groups and the diaphragm diameter is preferably effected by separate, but synchronous control of stepper motors via virtual control cams, as described in detail in the German patent application entitled "Method for Effecting the Synchronous Control of Several Stepping Motors," German Patent Application No. DE 10007201 A1, said application being hereby fully incorporated herein by reference.

Figure 3:
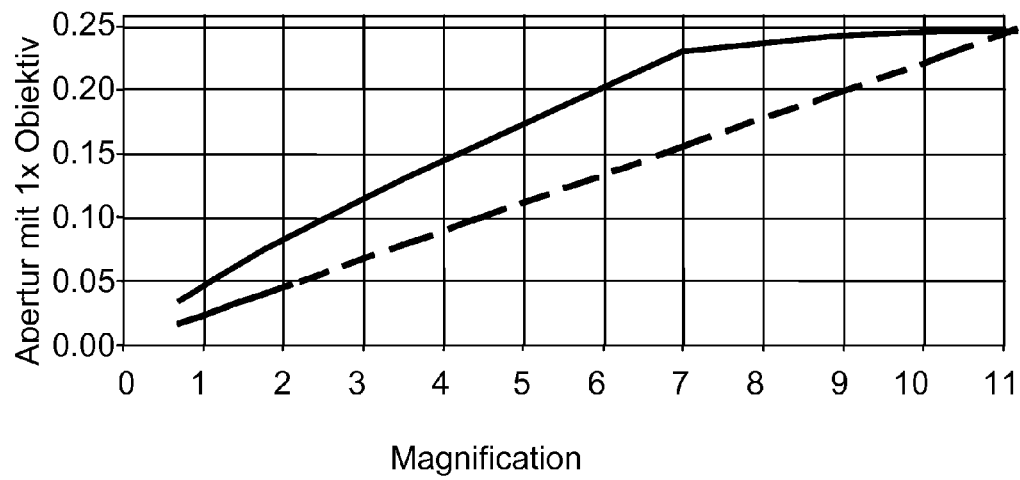

By means of a control element, preferably in combination with a status display, the user can select between at least two operating modes, exemplified in FIG. 3, with different stored control cams for the diaphragm motor: The solid line shows an operating mode in which the maximum object-side aperture and, thus, the maximum brightness are obtained. This setting is of advantage especially in applications with comparatively low object brightness, such as in the microscopy of faintly reflective objects, or in fluorescence applications.

Other operating modes possible in principle are arbitrary behaviors below the maximum aperture. These modes may be of advantage if losses of brightness are acceptable, (e.g., if a greater depth of focus is required). This is because maximum object-side aperture means not only maximum brightness and image-side aperture but also maximum resolution at minimum depth of focus. There, however, the image-side aperture may become so large that the highly resolved intermediate image cannot actually be resolved by the detector (which may be the observer's eye or a camera), whereas the low depth of focus is felt as a disadvantage.

FIG. 3 shows the principle of behavior of the object-side aperture in zoom systems designed according to the invention.

The resolving power, e.g., of a digital camera is defined by the pixel size. Structures can only be resolved with certainty if the structure to be resolved has a width of more than two pixels on the camera chip, i.e., if the intermediate image is scanned at a maximum spatial frequency $f_{max}$ by a detector having a scan rate $f_{scan} > 2 \cdot f_{max}$ (Nyquist-Shannon sampling theorem with Nyquist frequency=$\frac{1}{2} f_{scan}$).

For example, with a pixel size of 3 µm, this is attained only if the image-side aperture is smaller than 0.027. Smaller features projected onto the chip with a higher aperture will get blurred across the pixels and cannot be reproduced with certainty. There is a risk of artefacts, so that objects are recorded that would not be detected in this form if the scan rate were increased.

Accordingly, with larger pixels still smaller image-side apertures are favorable. By adapting the apertures to the resolving power of the detector, i.e., by closing down the diaphragm to an aperture diameter at which a resolution is obtained that can just be collected by the detector, one even achieves a gain in information: The resolution of the observed object remains constant (while the resolution of the intermediate image decreases); at the same time, the depth of focus of the image increases, so that, with three-dimensional objects, more information reaches the detector.

A particularly advantageous zoom behavior with artificially restricted apertures, implemented by an operating mode of the diaphragm, is shown by the broken line in FIG. 3. It illustrates an operating mode with a linear behavior of the object-side aperture.

Figure 4:
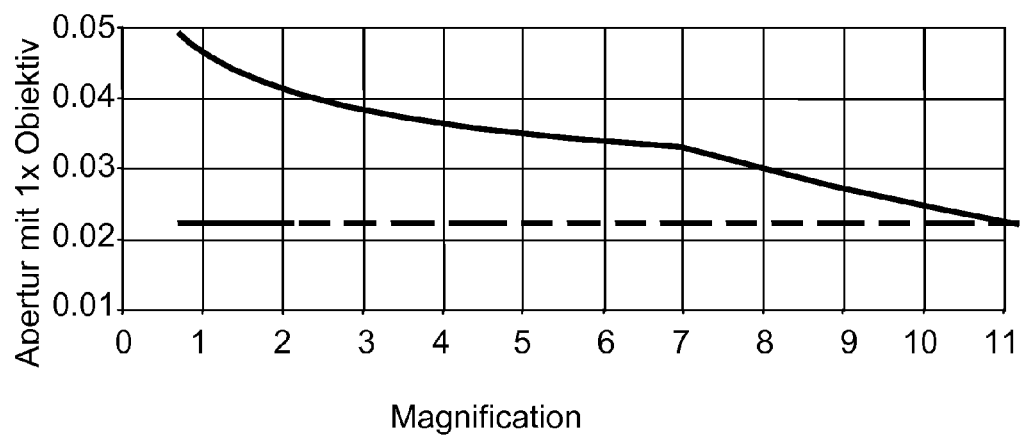

FIG. 4 shows, as examples, the image-side aperture behaviors resulting from the object-side apertures shown in FIG. 3. The solid line again shows the maximum behavior, which is of advantage for intensity-critical applications such as fluorescence microscopy. The broken line shows a constant behavior of the image-side aperture. According to the explanations above, this is of particular advantage for utilizing the resolving power of a detector equally in all zoom magnifications and, in addition, keeping the exposure time of the detector constant throughout the zoom range, because in all zoom magnifications the same quantity of light is captured by the detector.

At the same time, at each zoom magnification the system sets the maximum depth of focus that the detector can handle without resolution loss. By closing down the diaphragm still further, the depth of focus can be further increased, although only at the cost of resolution on the detector.

In FIG. 4, the image-side aperture for constant aperture behavior (broken line) is set that is attained as a minimum (at the highest magnification) in the behavior with maximum apertures (solid line). Constant behaviors are not possible with higher, but only with lower image-side aperture. Therefore, the aperture behavior can be adapted almost at will to larger pixel sizes of a CCD camera, restricted only by the exposure times desired.

In practice, this is possible with a limited number of operating modes, because, as another advantage of diaphragm control with a virtual control cam, the user has the possibility to close the diaphragm down to a specified aperture ratio (f-number), with the virtual diaphragm curve being electronically manipulated in such a way that this aperture ratio, rather than the one given by the control cam, is set for all zoom magnifications.

In this way, families of virtual control cams can be generated from a small number of virtual control cams stored.

In principle, then, any continuous behaviors of the image-side aperture below the maximum behavior indicated by the solid line can be implemented.

In the diaphragm control with virtual control cam presented here, other than described in the above-mentioned JP 2007-309976 AA, the diaphragm coupled to the movement of the movable lens groups and that directly manipulated by the user are physically identical. Thus, there is no need for the manually set diaphragm to be adjusted to match the variation of the coupled diaphragm, and all the disadvantages described at the beginning are remedied.

Any settings of zoom magnification and f-number can be saved and reproduced individually, jointly or in combination with other electronically controllable system parameters such as focus, illuminating brightness, camera shutter speed, fluorescence filter set etc., with the aid of suitable control features, e.g., the microscope's operating panel with or without touchscreen or PC. This is of advantage especially if the same instrument is to be used alternately for different applications or by more than one user.

For the reliable reproduction of the variation behavior of the diaphragm aperture, the diaphragm aperture needs to be initialized when the system is started, or else a measuring system must be employed that is capable of continuously tracking the diaphragm aperture.

Figure 5:
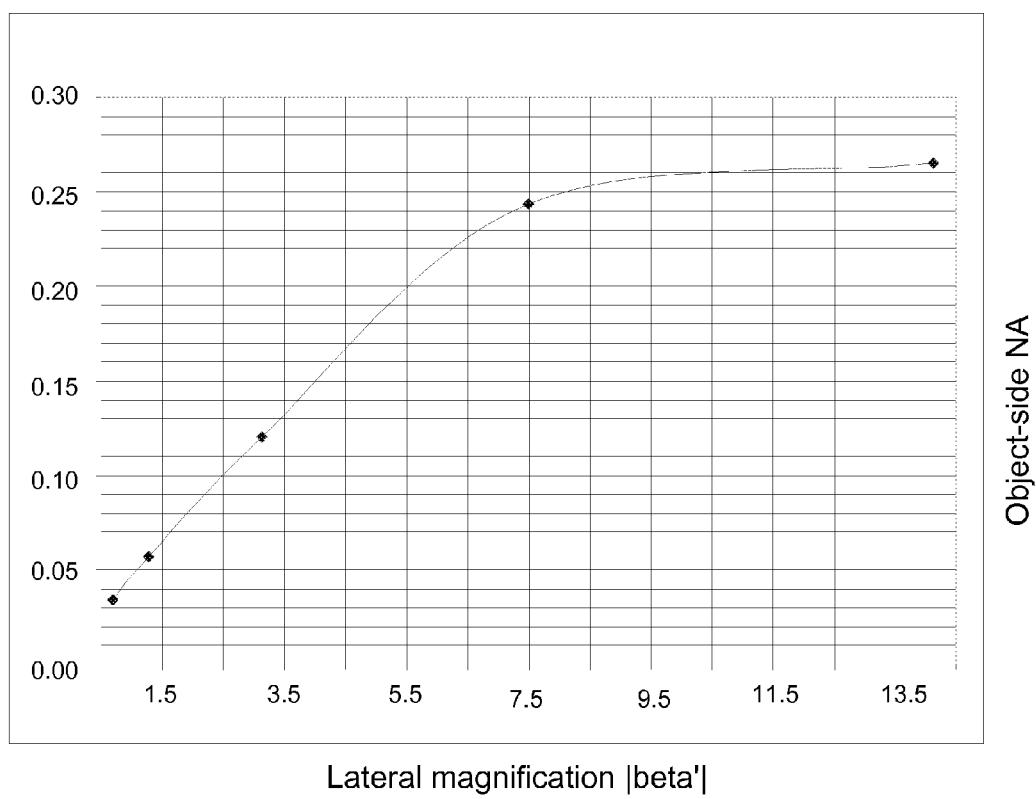

FIG. 5 shows a concrete object-side aperture behavior resulting if the invented zoom system is provided with an objective of focal length f'=72.75 mm and an f'=180 mm tube lens as a function of the lateral magnification beta' connected therewith. The object-side apertures in FIG. 5 are assigned lateral magnifications as specified in the table below:

| |beta'| | 0.700 | 1.274 | 3.133 | 7.5 | 14.000 |
|---|---|---|---|---|---|
| NA object-side | 0.034 | 0.057 | 0.120 | 0.243 | 0.265 |

As can be seen from the diagram, more than 90% of the maximum object-side are admitted already at a magnification of beta'=−7.5×. Thanks to this large numerical aperture and the constant size of the intermediate image, an object field almost twice as large is imaged with high resolution already at 53% of the final magnification.

Figure 6:
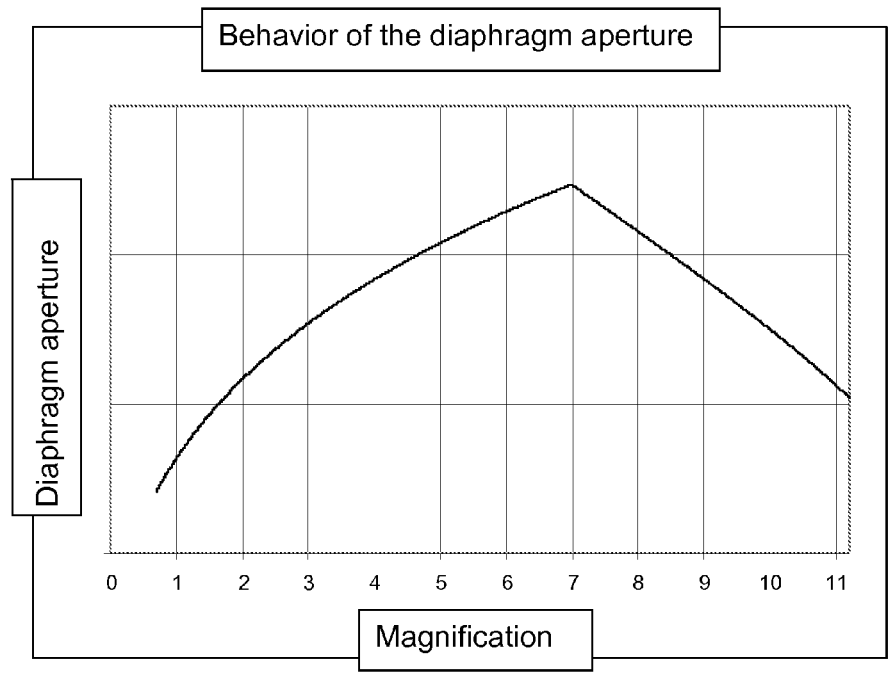

Whereas FIG. 3 shows the fundamental behavior of the object-side aperture in zoom systems designed according to the invention, FIG. 6 shows the behavior of the diaphragm aperture across the zoom range, that is achievable with the exemplary embodiment described above. It is obvious that, as the magnification is increased, the object-side aperture rises nonlinearly relative to the magnification, so that the object-side aperture in the range of low magnifications increases at a higher rate than in the range of higher magnifications. Starting from a small initial aperture at the lowest zoom magnification, the aperture diameter of the diaphragm increases until the object-side aperture approximately reaches its maximum. Subsequently, the diaphragm diameter drops steeply, whereas the object-side aperture increases but slightly further through the remaining zoom range.

What is claimed is:

1. A wide-range zoom system for use in microscopes, the system comprising:
   five lens groups, of which, counting from an object side toward an image side, the second lens group and the fourth lens group are axially shiftable relative to the first lens group, the third lens group and the fifth lens group, and in which a diaphragm of variable aperture diameter is provided between the second and the fourth lens group in a stationary position relative to the first, third and fifth lens groups, the aperture diameter increases monotonically as the zoom magnification is increased from a smallest to a medium zoom magnification, the diaphragm has a maximum aperture diameter at the medium zoom magnification, and the aperture diameter is decreases monotonically as the zoom magnification is further increased, so that, as the magnification is increased, the object-side aperture increases nonlinearly relative to the magnification in such a way that in lower magnification ranges the object-side aperture increases at a higher rate than in higher magnification ranges, and wherein the system has an entrance pupil diameter greater than 35 mm at the final magnification.

2. The zoom system of claim 1, in which the diaphragm is located between the third and the fourth lens group.

3. The zoom system of claim 1, in which, by zooming to 60% of the maximum magnification, at least 85% of the maximum possible aperture is set.

4. The zoom system of claim 1 in which the first lens group consists of three lenses and has a focal length of $f_1$=148 mm, the second lens group consists of three lenses and has a focal length of $f_2$=−27 mm, the third lens group consists of four lenses and has a focal length of $f_3$=40 mm, the fourth lens group consists of two lenses and has a focal length of $f_4$=−32 mm, and the fifth lens group consists of two lenses and has a focal length of $f_5$=144 mm.

5. The zoom system of claim 1 in which a constant field angle wa =3.7° is provided on the image side.

6. The zoom system of claim 1 in which, if a tube lens having a focal length of $f_7$=180 mm is used on the image-side, the image-side aperture does not exceed a value of 0.05.

7. The zoom system of claim 1 wherein the curvature radii r of the lenses, the thickness D of the lenses (or the distances between the lens groups at a magnification of 0.28x), the refractive index $n_e$ and the Abbe number $v_e$ of the lens material used according to the following table:

| Surface FL | Radius of curvature r | Thickness D | Refractive index $n_e$ | Abbe number $v_e$ |
|---|---|---|---|---|
| 1 | 91.11357 | 8.500 | 1.49845 | 81.0 |
| 2 | −71.14175 | 3.500 | 1.65803 | 39.5 |
| 3 | −183.02273 | 0.100 | | |
| 4 | 158.22772 | 4.500 | 1.51872 | 64.0 |
| 5 | 153.47275 | 6.6229 | | |
| 6 | 46.10683 | 2.500 | 1.43985 | 94.6 |
| 7 | 22.24624 | 4.100 | | |
| 8 | −30.07461 | 2.000 | 1.65391 | 55.6 |
| 9 | 18.58995 | 3.800 | 1.74341 | 32.0 |
| 10 | 88.60515 | 76.40868 | | |
| 11 | 30.46464 | 4.500 | 1.48794 | 84.1 |
| 12 | −262.91053 | 0.100 | | |
| 13 | 92.93645 | 2.500 | 1.88815 | 40.5 |
| 14 | 20.64110 | 5.200 | 1.53019 | 76.6 |
| 15 | −95.64532 | 0.100 | | |
| 16 | 68.18341 | 3.500 | 1.88815 | 40.5 |
| 17 | 309.33567 | 1.000 | | |
| AB 18 | infinity | 2.08654 | | |
| 19 | −32.67878 | 4.000 | 1.74341 | 32.0 |
| 20 | −14.11981 | 2.000 | 1.62033 | 63.1 |
| 21 | 38.55268 | 47.71906 | | |
| 22 | 63.50711 | 2.500 | 1.72539 | 34.5 |
| 23 | 40.87979 | 3.200 | 1.43985 | 94.6 |
| 24 | −178.06438. | | | |

8. The zoom system of claim 7, wherein variable air spaces D5, D10, D18, D21, and the diaphragm radius SDIA18 at magnifications 0.28×, 0.52×, 1.27×, 3.03× and 5.68× are according to the following table:

| GAMMA' | 0.28x | 0.52x | 1.27x | 3.03x | 5.68x |
|---|---|---|---|---|---|
| D5 | 6.623 | 26.308 | 48.817 | 66.224 | 81.032 |
| D10 | 76.409 | 56.723 | 34.215 | 16.808 | 2.000 |
| D18 | 2.087 | 10.153 | 24.792 | 41.500 | 46.926 |
| D21 | 47.719 | 39.653 | 25.013 | 8.305 | 2.880 |
| SDIA18 | 6.125 | 7.147 | 8.922 | 11.138 | 7.262. |

9. The zoom system of claim 1 in which shifting of the second and fourth lens groups as well as change of the diaphragm diameter is provided by synchronous individual control of stepper motors via virtual control cams.

* * * * *

UNITED STATES PATENT AND TRADEMARK OFFICE
CERTIFICATE OF CORRECTION

| | | |
|---|---|---|
| PATENT NO. | : 8,958,159 B2 | Page 1 of 1 |
| APPLICATION NO. | : 13/824250 | |
| DATED | : February 17, 2015 | |
| INVENTOR(S) | : Michael Wacke et al. | |

It is certified that error appears in the above-identified patent and that said Letters Patent is hereby corrected as shown below:

In the claims

Col. 8, line 18, after "used", insert --are--

Signed and Sealed this
Twelfth Day of January, 2016

Michelle K. Lee
*Director of the United States Patent and Trademark Office*